A. ROSE.
Churn.
No. 25,914. Patented Oct. 25, 1859.
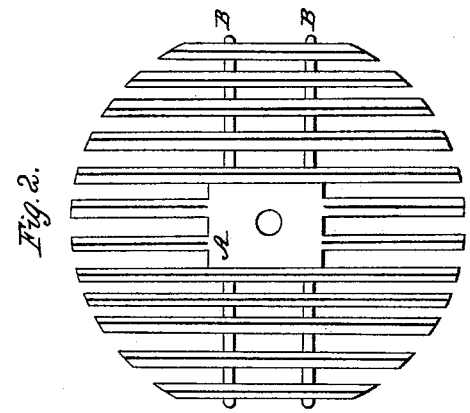
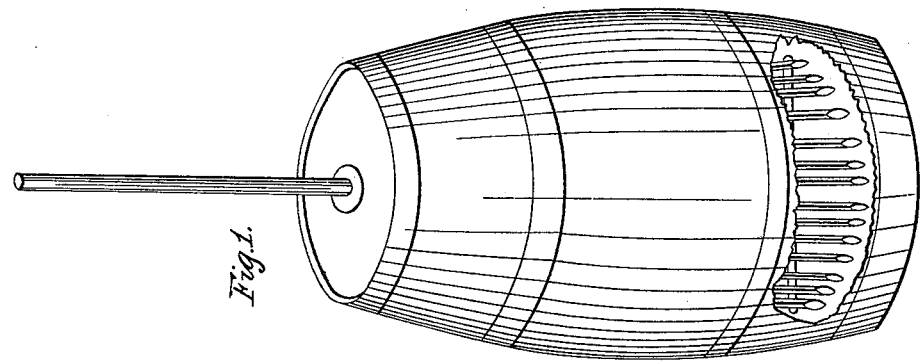
Witnesses:
Charles Hetchum
Wm Comstock
Inventor:
Alfred Rose

UNITED STATES PATENT OFFICE.

ALFRED ROSE, OF PENN YAN, NEW YORK.

CHURN-DASHER.

Specification of Letters Patent No. 25,914, dated October 25, 1859.

*To all whom it may concern:*

Be it known that I, ALFRED ROSE, of Penn Yan, in the county of Yates and State of New York, have invented a new and Improved Churn-Dasher; and I do hereby declare that the following is a full, clear, and exact description of the construction and operation of the same, reference being had to the annexed drawings, making a part of this specification, in which—

Figure 1, is a view of the churn with a part removed to show the dasher. Fig. 2, is a view of the upperside of the dasher.

The churn is of the ordinary, or any other construction.

The dasher may be made of wood or metal as represented in Fig. 2.

A, is the center piece with a hole in the center to receive the dasher staff. The outer ends are made into breakers, oval in shape or with the upper and lower edges nearly sharp as a cutting instrument; there are two parallel holes bored horizontally through it to put rods that hold the other breakers. These rods may be any size to suit the size of dasher required. The other breakers are made oval or shaped as the others as shown in Fig. 1, with corresponding holes to receive the rods B and B. The length must be such that when they are put upon the rods the ends will be in a circle or nearly so when used in a round churn. They may be adjusted to the width required to give the necessary agitation and if more agitation is required put on more of the breakers, thereby reducing the space between them and any amount of agitation required may by this means be produced.

To use my invention place it into the cream in the churn and move it up and down with any convenient power until the butter is entirely separated from the buttermilk.

What I claim as my invention and desire to secure by Letters Patent is—

The churn dasher when made in the manner substantially as specified and set forth.

ALFRED ROSE.

Witnesses:
 WM. COMSTOCK,
 CHARLES KETCHUM.